No. 737,793. PATENTED SEPT. 1, 1903.
W. D. SUTTON.
WHIFFLETREE HOOK.
APPLICATION FILED JUNE 30, 1903.
NO MODEL.

Witnesses
M. R. Wilson
M. A. Schmidt

Inventor
Wm. D. Sutton
by Milo B. Stevens & Co
Attorneys

No. 737,793. Patented September 1, 1903.

UNITED STATES PATENT OFFICE.

WILLIAM D. SUTTON, OF MANLY, IOWA.

WHIFFLETREE-HOOK.

SPECIFICATION forming part of Letters Patent No. 737,793, dated September 1, 1903.

Application filed June 30, 1903. Serial No. 163,768. (No model.)

*To all whom it may concern:*

Be it known that I, WILLIAM D. SUTTON, a citizen of the United States, residing at Manly, in the county of Worth and State of Iowa, have invented certain new and useful Improvements in Whiffletree-Hooks; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to whiffletree-hooks, and has for its object an improved construction whereby the traces will be securely held to the tree, so that they cannot become detached or unhooked accidentally by a slacking of the same or otherwise.

Figure 1:
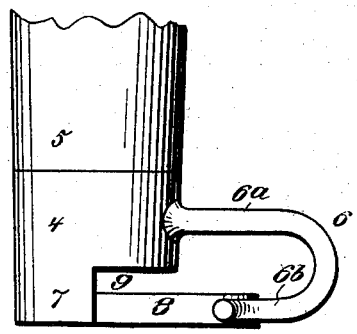
Figure 2:
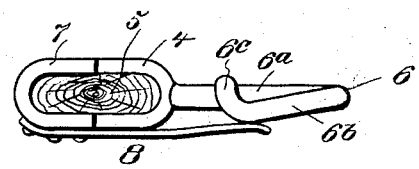

In the accompanying drawings, Figure 1 is a top plan view of my invention. Fig. 2 is an end view thereof.

Referring specifically to the drawings, 4 indicates a ferrule, which is secured on the outer end of a whiffletree 5. Extending forwardly from the ferrule is a hook 6, whose opposite sides $6^a$ and $6^b$ lie in a substantially horizontal plane, the side $6^b$ lying slightly below the side $6^a$. The end of the hook is turned up, as at $6^c$. The ferrule has an extension 7, which projects beyond the end of the whiffletree, and on the under side of the extension a flat spring 8 is secured, which extends forwardly under the end of the hook 6, its end being curved slightly downward. The spring presses upwardly against the end of the hook. The extension 7 of the ferrule is cut away, as at 9, to permit the trace-hook to enter the hook 6.

On the opposite end of the whiffletree the hook extends in an opposite direction and the other parts are also reversed, as will be understood.

Having thus described my invention, what is claimed as new, and desired to be secured by Letters Patent, is—

A whiffletree-hook comprising a ferrule, a hook thereon extending forwardly therefrom in a substantially horizontal plane, an extension of a portion of the ferrule beyond the end of the whiffletree, and a spring on the extension bearing upwardly against the end of the hook, substantially as described.

In testimony whereof I affix my signature in presence of two witnesses.

WILLIAM D. SUTTON.

Witnesses:
E. N. KESSEY,
J. H. LYFORD.